Dec. 17, 1940.  W. B. CASSELS  2,225,206
SPEED CONTROL
Filed Dec. 15, 1937   3 Sheets-Sheet 1
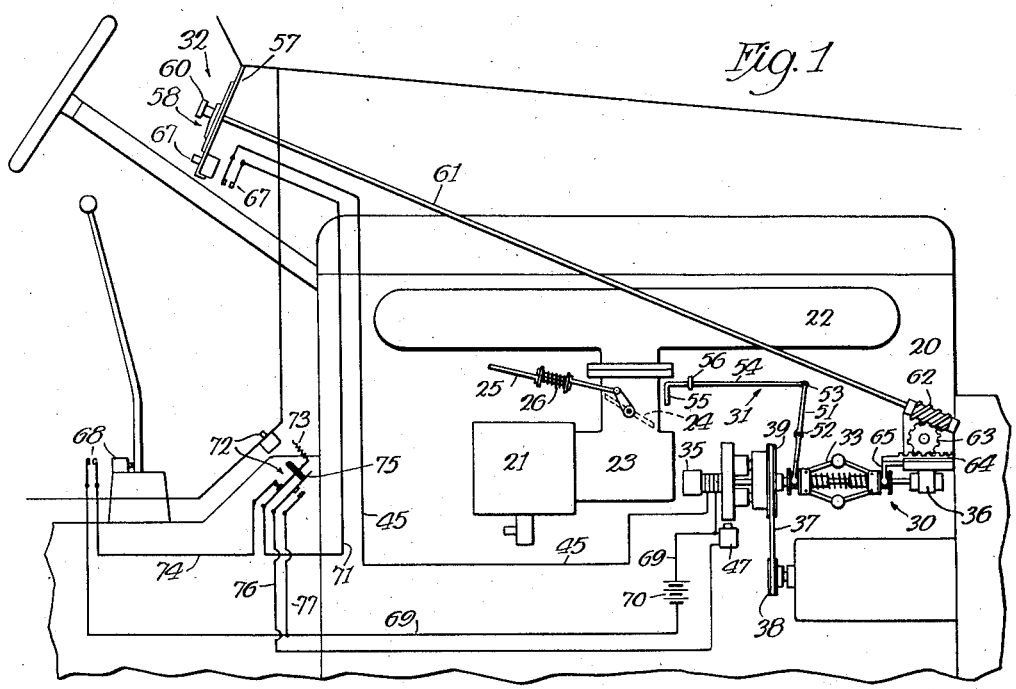
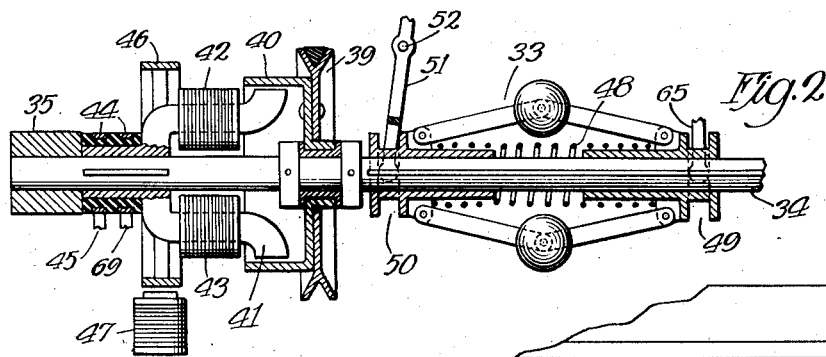
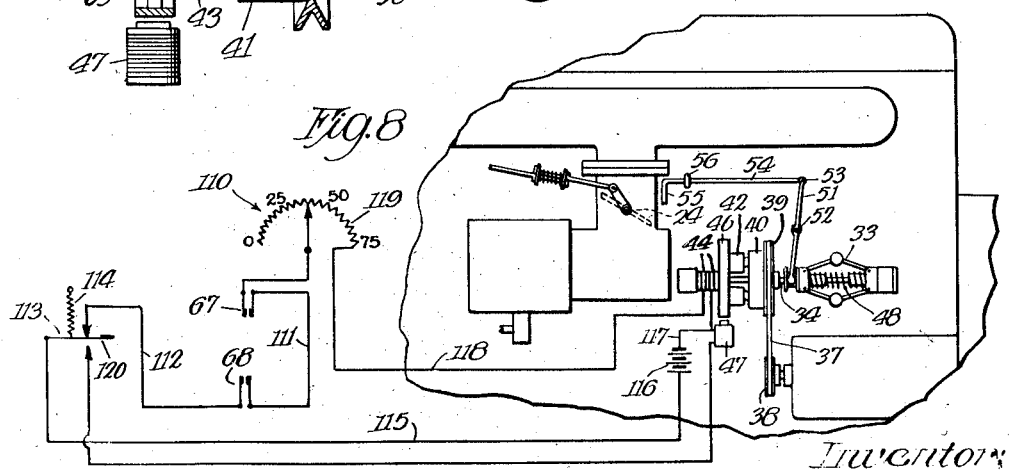
Inventor:
William B. Cassels
By Gillson, Mann & Attys.

Dec. 17, 1940.  W. B. CASSELS  2,225,206
SPEED CONTROL
Filed Dec. 15, 1937  3 Sheets-Sheet 2
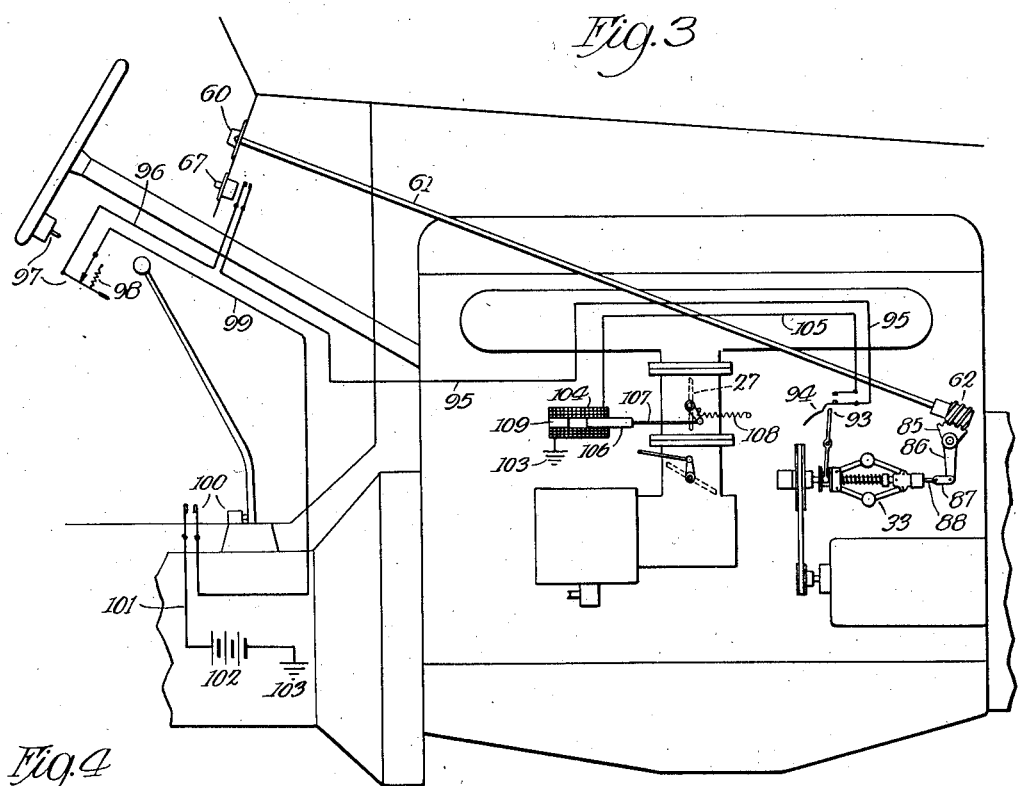
Fig. 3
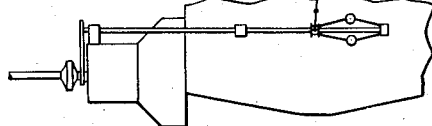
Fig. 4
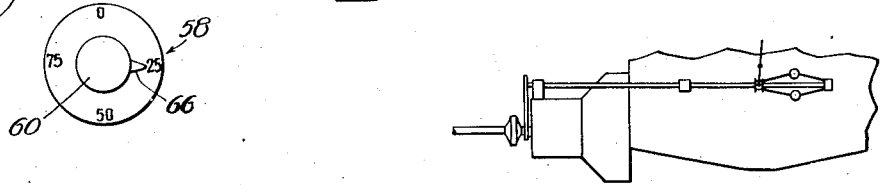
Fig. 7
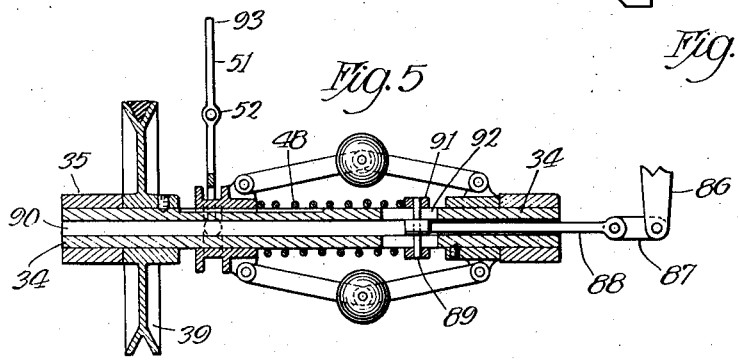
Fig. 5
Fig. 6
Inventor:
William B. Cassels Dec. 17, 1940.   W. B. CASSELS   2,225,206
SPEED CONTROL
Filed Dec. 15, 1937   3 Sheets-Sheet 3

Inventor:
William B. Cassels
By Gilson, Mann & Gettys

Patented Dec. 17, 1940

2,225,206

UNITED STATES PATENT OFFICE 2,225,206

SPEED CONTROL

William B. Cassels, Clarendon Hills, Ill.

Application December 15, 1937, Serial No. 179,862

5 Claims. (Cl. 180—82.1)

This is a continuation in part, of application, Serial No. 75,200, filed April 18, 1936, and the original application is hereby made a part of this case.

The ever increasing demand for greater power and the consequent increase in speeds in automobiles has brought about a problem of safety which is rapidly becoming more and more acute. The number of serious accidents with the accompanying loss of lives is steadily increasing, but up to the present time there is very little that has been done to effectively remove the cause of the majority of these accidents.

A large majority of these accidents undoubtedly are caused by excessive speeds particularly on curved portions of the road or in other localities where road conditions or surrounding neighborhood conditions are such that throttled speeds are necessary.

With the increased riding comfort of the present day car, the driver is not conscious of the fact that he is traveling at a dangerous speed even though he may have received a warning notice along the highway to drive slowly. This is especially true where a driver has been traveling for some time at a very high rate of speed, say 70 miles an hour or more. When reducing the rate from such high speeds, a rate of say 45 or 50 miles seems to the driver to be a slow rate of speed. This is a natural reaction and is the experience of most everyone who has driven any of the newer cars.

In many places road conditions are such that a speed of 45 miles an hour is much too great so that even though the driver may think he is obeying the warning notice and is driving slowly, in reality he is still traveling at a dangerous rate of speed.

Most drivers do not deliberately break the speed laws and do not intend to be reckless, but it is rather due to their negligence that they are reckless.

To prevent operating at excessive speeds, it is often the practice to employ the use of a governor which will permit the car to operate only up to a predetermined maximum limit. This is especially common with respect to trucks and buses and, perhaps, on new private automobiles, but is less common on the ordinary automobile.

There is a question, however, whether such a device adds to the safety of the operation of the car; in fact under the present road and traffic conditions such a governor may prove as dangerous, if not more so, than a car traveling at an extremely high speed.

Take, for example, a car traveling along the highway at say, 45 miles an hour. A second car having a single speed governor limiting its speed to 50 miles an hour approaches the first car and attempts to pass. The governor may prove extremely dangerous if this second car cannot avail itself of its maximum power in case a vehicle should be approaching from the opposite direction.

It often happens that a driver is faced with a situation in which he must have all available power in order to avoid an accident, and any device which does not provide for this is impractical and may prove extremely dangerous.

Among the principal objects of this invention, then, are the following:

To provide a speed control device which will effectively limit the maximum speed of operation of a vehicle by which a predetermined maximum limit may be selected from a point situated conveniently to the driver of the vehicle; to provide such a device which may be disengaged from its operation on the vehicle instantaneously at the will of the driver; to provide a speed control device which does not affect the available power in the low speed positions of the transmission and to provide a speed control device which may be substantially instantaneously disengaged from operation on the vehicle at the will of the driver, but which requires a continuous act on the part of the driver to maintain the control in its disengaged position.

Other objects and advantages will become apparent as the disclosure proceeds and the description is read in conjunction with the accompanying drawings, in which Fig. 1 is a diagrammatic view of one form of the control device shown in its relationship to an automobile engine;

Fig. 2 is an enlarged detail view of the fly-ball governor shown in Fig. 1, showing the method of mounting the governor on the shaft, and also showing the electric drive and brake employed in operating the fly-ball governor;

Fig. 3 is a diagrammatic view of an alternative form of the invention;

Fig. 4 is an enlarged detail drawing showing the dial for selecting the desired maximum speed of operation and which is mounted on the dashboard, as shown in Fig. 3;

Fig. 5 is an enlarged sectional view of the flyball governor employed in the form shown in Fig. 3, showing in detail the spring and adjustable spring seat arrangement;

Fig. 6 is a transverse sectional view taken through the shaft of the governor shown in Fig. 5;

Fig. 7 is a fragmentary side elevational view of a governing device shown connected to receive its power from the driven side of the transmission;

Fig. 8 is a fragmentary side elevational view showing diagrammatically, another modified form of the invention;

Figure 9:
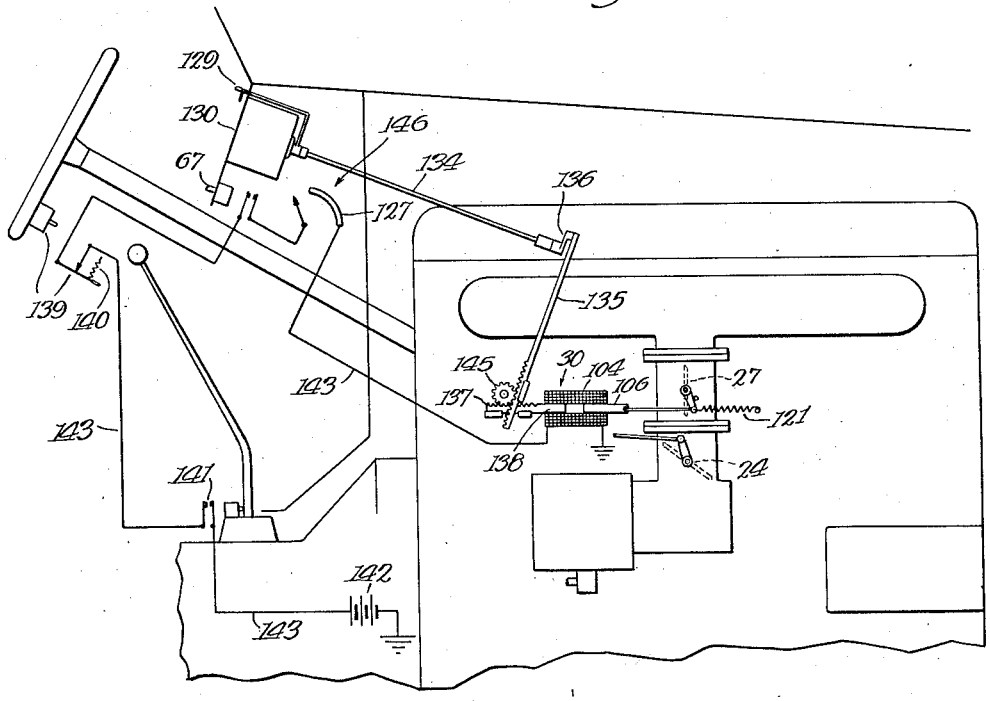
Fig. 9 is a diagrammatic view of another modified form of the invention showing, in addition, the application of a control applied to a butterfly valve independent of the usual throttle valve.
Figure 11:
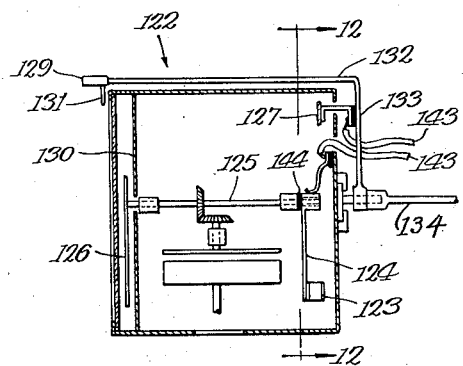
Fig. 11 is a vertical sectional view of the speedometer employed in Fig. 9, showing generally the electrical contact members in this form of the invention.

Specific embodiments of the present invention are selected for the purpose of disclosure only, in compliance with section 4888 of the revised statutes, and are not intended to place limitations on the claims other than is required by the existing art.

Referring to Fig. 1, the invention is shown applied to the conventional gasoline automobile which includes an engine block 20 to which is secured a carburetor, indicated at 21, the usual intake manifold 22, and a passage 23 extending from the carburetor 21 to the manifold 22, the usual throttle valve 24 operated from within the car through a rod 25.

As shown in Fig. 1, the control device operates on the usual throttle valve 24, in which case it is necessary to insert in the rod 25, the yielding connection 26 to permit the control device to operate against the force of the driver's foot on the accelerator pedal. A separate throttle valve may be employed, however, as shown in Fig. 3 and the control device may be caused to operate on a second throttle valve 27, as shown in Fig. 9.

The speed control device itself, consists broadly of a governing device, generally indicated at 30, which is caused to respond to the speed of the engine in its operation, as shown in the forms disclosed in Figs. 1, 3 and 8 or to respond to the speed of the vehicle, as shown in the forms disclosed in Figs. 7 and 9, a means 31 for causing the governing device to operate on the throttle valve, or perhaps accelerator pedal (not shown) to adjust its movement, and finally some means 32 for determining the speed at which the governing device comes into operation. In addition to this the invention includes some means for disengaging the control device from its operation on the vehicle, and a further means for permitting the control device to be engaged only in high speed of the transmission.

More particularly one form of the invention comprises a fly-ball governor 33 of any well known type, splined to a shaft 34, as shown in Fig. 2, which in turn is supported at its ends by bearings 35 and 36. These bearing members are carried by the engine block. The shaft 34 is caused to rotate by means of a belt 37 which takes power from the pulley 38 mounted on the generator drive and transmits its rotative power to the second pulley 39 which is mounted on the shaft 34 in such a manner that it is free to rotate although the shaft 34 is standing still.

Secured to the pulley 39 is an armature 40 which rotates with the pulley 39. This armature cooperates with a pole piece 41 which is keyed to the shaft 34 in some suitable manner to drive the shaft 34 when the pole piece 41 is energized by electromagnets 42 and 43 surrounding the arms of the pole piece. Current for energizing these electromagnets is passed through slip rings 44 which receive their current from electrical conductors 45 and 69.

Also keyed to the shaft 34 is a second armature 46 which cooperates with an electromagnet 47 to act as an electric brake when the magnet 47 is energized.

The fly-ball governor 33 is normally held in the position shown in Fig. 2 with the balls held close to the shaft 34 by a coiled spring 48 extending between the collars 49 and 50, situated at each end, respectively, of the governor. Assuming that the pole piece 41 is energized so as to cause the shaft 34 to rotate at a speed corresponding to the speed of the generator shaft, when rotation of the shaft 34 reaches the critical speed at which the resistance of the spring 48 is overcome the governor balls will fly out away from the shaft 34 causing the collar 50 to approach the collar 49.

Pivoted to the collar 50 is a lever 51 fulcrumed at its center, as shown at 52, and having a free end 53 to which is pivotally secured a connecting rod 54. At the free end of the rod 54 is a stop 55 adapted to engage the throttle valve 24 when the governor is caused to operate on the valve. The rod 54 is guided in its motion by means of a guide member 56.

The collar 49 acts as a stationary end of the fly-ball governor 30, which is adjustable on the shaft so as to regulate the amount of space or lost motion provided between the stop and throttle valve 24. Adjustment is made from a position conveniently situated with respect to the driver of the vehicle and as shown is positioned on the dash-board 57 and may be regulated by a dial indicated at 58. The rotation of the adjuster knob 60 on the dial 58 is carried through a shaft 61 to a worm 62 secured to the free end of the shaft 61. This worm is positioned so as to engage a pinion 63 which in turn engages a rack 64, which operates in a plane parallel to the shaft 34, and is secured to the collar 49 through an arm 65. The pitch of the teeth of the worm wheel is so selected that the mechanism for adjusting the position of the fly-ball governor on the shaft 34 will be self-locking. To obtain this condition it may be necessary to furnish additional gearing in the mechanism but for the purpose of illustration the worm, pinion and rack are shown.

Under ordinary conditions of operation of the car the pulley wheel 39, receiving its rotative power from the generator through the belt 37 is permitted to rotate freely on the shaft 34, while the shaft itself and consequently the flyball governor 33 remain at rest. When it is desired to select a maximum speed at which the car is to be operated, the driver simply turns the knob 60, shown in Fig. 4, so that the pointer 66 indicates the speed which the driver selects as his maximum. This rotation of the knob 60 causes the collar 49 to move backward or forward on the shaft 34, thus adjusting the amount of lost motion between the stop 55 and the throttle valve 24. When this adjustment has been made the driver then closes a switch 67 positioned on the dash-board, and if the car is operating in the high speed of the transmission, the switch 68 will be closed and consequently the circuit to the electromagnets 42 and 43 will be completed through conductors 69, a source of current 70, slip ring 44, a conductor 45 through switch 67 and conductor 71 through a snap switch 72 normally held in closed position by means of a spring 73 and then back to the switch 68 through conductor 74.

The closing of this circuit energizes the electro-magnets 42 and 43 causing the pole piece 41 to be driven by a rotating armature 40, thereby driving the shaft 34 at a speed proportional to the rotation of a generator shaft.

If for any reason it is desired to instantaneously disengage the speed control device from its operation on the car, the driver need merely to snap the switch 72 with his foot which causes the contact member 75 to pivot thus breaking the circuit to the electromagnets 42 and 43 but causing the contact member 75 to complete a second circuit which includes a conductor 76, the breaking electromagnet 47, conductor 69, the source of electrical current 70, the conductor 77 and back to the contact member 75. The energizing of this breaking electromagnet 47 applies an electric braking action to the shaft 34 causing the fly-ball governor 33 immediately to come to rest, thus permitting the throttle valve 24 to be operated by the accelerator pedal (not shown) without in any way being obstructed by the stop 55.

It is to be made clear at this point that the possible drives for the shaft 34 are not intended to be limited to the electric drive, selected for the purpose of illustration, for obviously a mechanical, hydraulic or any other suitable drive may be employed.

Furthermore the location of the snap switch 72 on the floor of the vehicle is not intended to place an unnecessary limitation on the scope of the claims, as obviously the switch may be positioned on the steering wheel, as shown in Figs. 3 and 9, or any other place which will be convenient to the driver.

In the form of the invention shown in Fig. 1, the fly-ball governor has but one critical speed of operation, namely, that corresponding to the strength of the coiled spring 48. When this critical speed is reached, the resistance of the spring 48 is completely overcome so that the collar 50 performs its full stroke until it is stopped by collar 49. The degree to which the throttle valve 24 may be opened by the accelerator foot pedal (not shown) before it engages the stop 55 will depend upon the position of the stop when the collar 50 has performed its full stroke toward the collar 49. This position of the stop 55 can be adjusted by moving the entire fly-ball governor as a unit along the splined shaft.

Instead of providing one critical speed of operation of the fly-ball governor 33 it may be desirable to vary this critical speed so as to selectively determine the time at which the governor will come into operation. This may be done, as shown in Fig. 3, by changing the critical speed of the spring 48.

The adjustment of the knob 60 again operates through the shaft 61 to the worm gear 62 which in turn imparts motion to the toothed sector 85. Integral with this sector is an arm 86 which is pivotally secured at its free end to one end of a link 87. The other end of the link 87 is pivotally secured to a rod 88 which in turn is adapted to receive at its other end a pin 89.

In this form of the invention the governor shaft 34 is hollow, providing an opening 90 at its longitudinal center for receiving the rod 88, as shown in Fig. 5.

Surrounding the shaft is a ring 91 apertured to receive the pin 89, as shown in Fig. 5 and constituting a seat for the spring 48. Pin 89 extends through the shaft and is permitted to move longitudinally of the shaft by means of a slot 92 which limits this longitudinal movement. Instead of causing the fly-ball governor to operate directly upon the throttle valve 24 it may be desirable to manipulate this valve electromagnetically employing the fly-ball governor merely to open and close the circuit to the electromagnet. In this form of the invention the free end 93 of the lever 51 constitutes an electrical contact member which engages a complementary contact member 94 to complete a circuit through conductor 95, dash-board switch 67, a conductor 96, a steering wheel switch 97 normally held in the closed position by means of a spring 98, a conductor 99 through the transmission switch 100, conductor 101, source of current 102, through the ground 103 to a solenoid 104 and back to the complementary contact member 94 through the conductor 105.

When the various switches in this circuit are all closed the solenoid 104 will be energized causing it to exert a pulling force on the armature core 106, which in turn exerts a pull through the rod 107 to the second throttle valve 27 tending to close the valve against the force of the spring 108 which normally holds this valve in the open position as shown in Fig. 3. The stop 109 is provided to limit the stroke of the core 106, the position of this stop being dependent upon the minimum desired maximum speed to which the car is to be limited by the control device.

When the maximum speed of the car is desired to be limited, the indicator 66 is adjusted to the selected speed and the switch 67 is closed. The turning of the knob 60 on the dial 58 imparts motion to the rod 88 through the worm, sector and link mechanism so as to adjust the position of the spring seat 91 thereby selecting a particular critical speed at which the fly-ball governor will come into operation.

Say, for example, that the speed to which the dial is to be set is 25 miles an hour. The rotation of the knob 60 to this position will move the spring seat 91 along the shaft 34 so as to change the load constant of the spring 48, so that the fly-ball governor 33 will come into operation when the shaft 34 has obtained a speed rotation corresponding to the speed of the vehicle of 25 miles an hour.

When this critical speed is reached the lever 51 is caused to pivot about its fulcrum 52 so as to obtain a contact between the complementary contact members 93 and 94 thus completing the circuit to the solenoid 104. Immediately upon energizing the solenoid 104, the core 106 will be forced into the solenoid until its travel is interrupted by the stop 109.

Assume for the purpose of illustration that the stop 109 is so positioned that when the core 106 has traveled its full stroke into the solenoid 104, the throttle valve 27 will be closed to a position which will limit the speed of the vehicle to say 15 miles an hour. Since the dial 58 has been adjusted to 25 miles an hour, the car speed will be lowered only to this selected value, because as the speed tends to diminish further the fly-ball governor 33 will cause the circuit to be broken at 93 and 94 thus deenergizing the solenoid 104 and causing the valve 27 to be opened by the force of the spring 108.

Instead of changing the load constant of the spring 48 in the fly-ball governor thereby selectively changing the speed at which the governor comes into operation, it may be preferable to change the relationship of the speeds between the fly-ball governor shaft and the generator shaft. This may be done mechanically through any well known means such as a cone drive or the like. For the purpose of illustration an electric clutch has been selected and is shown in Fig. 8.

In this form of the invention the fly-ball governor 33 is keyed to the shaft 34 and the mechanism connecting the governor with the throttle valve 24 comprises the lever 51 and the rod 54. As described, the power of rotation is received from a pulley 38 located on the generator shaft and is transmitted through the belt 37 to the pulley 39, the latter carrying an armature 40 as in the form shown in Fig. 1. The same arrangement of a pole piece 41 and electromagnets 42 and 43 are employed, the latter receiving their energizing current through slip rings 44.

In this form of the invention, however, instead of causing the pole piece 41 to drive the armature 40 directly with a one to one ratio of speeds between the two, a certain amount of slippage is provided between the pole piece 41 and the armature 40 so that the speed of the pole piece 41 and consequently the speed of the governor shaft 34, may be less than the speed of the armature 40 which of course is the same as the speed of the belt 39. The exact ratio between these two speeds is dependent upon the strength of the magnetic pole piece 41 and this in turn is proportional to the amount of energizing current passing through the solenoids 42 and 43.

To vary this current a rheostat generally indicated at 110 is employed to change the amount of resistance in the circuit thereby determining the amount of energizing current passing through the solenoids 42 and 43. This rheostat may be situated on the dash-board or in some other position convenient to the driver and may be manipulated by means of a dial arrangement similar to the one shown in Fig. 4.

The circuit will be so calibrated that for a given setting of the rheostat there will be a sufficient amount of resistance in the circuit to cause a definite relationship between the speeds of the pole piece 41 and the armature 40, so that the speed of the fly-ball governor 33 will reach the critical speed of the spring 48 when the vehicle itself is traveling at the speed corresponding to the rheostat setting.

In this form of the invention the circuit comprises the usual dash-board switch 67, the conductor 111, the transmission switch 68, a conductor 112, throw-out switch 113, positioned either on the floor or on the steering wheel or at some other convenient place and normally held in closed position by spring 114, a conductor 115, a source of current 116, a conductor 117 to slip rings 44 and thence to the electromagnets 42 and 43 and then back through conductor 118 to the resistance element 119 of the rheostat 110.

In this form as in the one shown in Fig. 1, it is necessary to provide some means for instantaneously braking the rotation of the governor and here, as before, an electromagnetic brake is employed, which is caused to operate when the contacting member 120 is moved to energize the electromagnets 47 of the magnetic brake.

In this form of the invention the action of the throttle valve 24 is unimpeded until the predetermined maximum speed is reached, at which time the governor 33 operates to move the stop 55 into a position which will close the throttle valve 24 a predetermined amount, which amount is always the same regardless of the setting of the rheostat 110.

In the form of the invention shown in Fig. 9 the use of a fly-ball governor has been dispensed with entirely and instead the solenoid itself constitutes the governing device in the car. A second butterfly valve 27 is employed and it is normally held in the open position, as shown in Fig. 9, by means of a spring 121. The usual throttle valve 24 is manipulated by the accelerator pedal (not shown) and the valve 27 remains in the open position so as not to interfere with its operation until a predetermined maximum speed of the vehicle is reached.

A speedometer, generally indicated at 122, is employed to close the circuit to the solenoid 104, and this is accomplished by providing a contact brush 123 at the end of an arm 124 which in turn is pivoted on the shaft 125 which carries the usual indicator pointer 126.

A contact strip 127 is provided which is adapted to move in a slot 128, the change of the position of this strip being effected by a knob 129 which extends outwardly from the face of the speedometer dial 130 which is situated on the dash-board. The knob 129 is provided with a pointer 131 which indicates the setting of the control device.

As this knob 129 is moved around the periphery of the dial 130 it adjusts the position of the contact strip 127 through arms 132 and 133 and at the same time rotates the shaft 134 which in turn imparts substantial linear motion to the rack 135 through a crank 136. This motion of the rack 135 rotates the pinion 145 which in turn imparts linear motion to a second rack 137 thereby adjusting the position of the stop 138.

Figure 10:
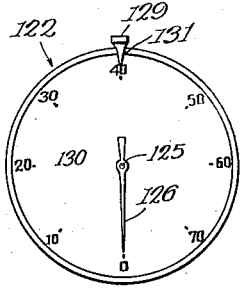
Fig. 10 is an enlarged view of a speedometer employed in the form of the invention shown in Fig. 9.
Figure 12:
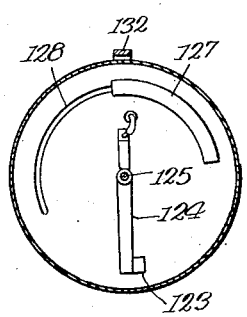
Fig. 12 is a vertical sectional view, taken along line 12—12 of Fig. 11.

The relationship of the various parts employed in this form is such that when the pointer 131 indicates a certain speed, say, for example, 40 miles an hour as shown in Fig. 10, contact strip 127 will be positioned so that the brush 123 will not complete the circuit to the solenoid 104 until the speed of 40 miles an hour has been reached, and in addition to this when the pointer is in the position shown in Fig. 10, adjustable stop 138 is in such a position that the throttle valve 27 will be closed when the predetermined speed is reached to a position corresponding to this predetermined speed.

In this form the circuit comprises the speedometer controlled switch generally indicated at 146, the dash-board switch 67, a throw-out switch 139, normally held in its closed position by means of spring 140, the transmission switch 141, a source of current 142, the solenoid 104 and proper conductors 143 for placing these elements in series.

There is no need of placing a braking means for disengaging the governing device in this form of the invention because the solenoid 104 will become disengaged practically instantaneously when the switch 139 is opened.

Insulation 144 is provided between the arm 124 and the main part of the shaft 125 to prevent the electric current from passing to the shaft 125.

As shown in Fig. 7, the fly-ball governor may receive its power from the driven side of the transmission, in which case it is not necessary to employ a switch in conjunction with the gear shift lever for disengaging the governor from its operation on the vehicle in first and second speeds of the transmission because the operation of the governor depends upon the speed of rotation of the driven side of the transmission, which, in turn, operates in direct proportion to the speeds of the car in first and second; and first and second in this instance would be limited by the setting of the governor, the same as in the case of the high speed position of the transmission.

I claim as my invention:

1. In a power driven vehicle, a source of power in driving relationship with the vehicle, a fuel line feeding fuel to the source of power, a throttle valve in the fuel line, speed control means responsive to the speed of rotation of a rotating member in the vehicle drive when the vehicle is operating for limiting the throttle opening and comprising a speed responsive device operatively connected to the valve to limit the degree of opening of the valve in the fuel passage, manual control means accessible to the driver when operating the vehicle for selectively varying the critical speed at which the speed control means operates, means regulated by the manual control means for limiting the degree of opening of the valve for each setting to correspond to the minimum required opening to maintain the selected maximum vehicle speed, and manual disengaging means accessible to the driver when he is operating the vehicle and associated with the speed responsive means for substantially instantaneously disengaging the speed control means from its operation on the vehicle.

2. In a power driven vehicle, a power source in driving relationship with the vehicle, a fuel line feeding the power source, a normally open throttle valve in the fuel line controlling the flow of fuel to the power source, a speed control device comprising an electro-magnetic coil, an electrical circuit including a source of current, an armature movable in the field of the coil, means operatively connecting the armature to the valve so that movement of the armature in response to the energization of the coil partially closes the valve to a predetermined position, an adjustable stop limiting the movement of the armature in response to the coil energization so as to limit the degree of closing of the valve to the predetermined position, the position of the stop for each adjustment corresponding to the degree of valve opening to power the car at its selected speed, spring means normally holding the valve in an open position and resisting the pull of the armature when the magnetic coil is energized, a speed indicator operating proportionately to the speed of the vehicle, a normally open circuit breaker in the electrical circuit operating in conjunction with the speed indicator to close the circuit to energize the coil when a predetermined vehicle speed is reached during normal operation of the vehicle, means associated with the speed indicator for selecting the critical speed of operation of the speed control device, and a second circuit breaker in the electrical circuit adapted to open the circuit at the will of the operator irrespective of the speed at which the vehicle may be operated.

3. In a self-propelled vehicle, a motor in driving relationship with the vehicle, a fuel line adapted to feed fuel to the motor, a normally open throttle valve in the fuel line, a spring resiliently holding the valve in open position, a second throttle valve in the fuel line controlled by the operator for normal operation of the vehicle, a speed control device comprising an electro-magnetic coil, an electrical circuit including a source of current, a movable iron core in the coil operatively connected to the first valve, the spring normally holding the core partially outside the coil and adapted to resist the movement of the core into the coil in response to the coil energization, an adjustable stop cooperating with the core to limit its movement into the coil in response to the energization of the coil, means accessible to the vehicle driver when he is operating the vehicle to change the position of the stop, the position of the stop for each setting corresponding to the degree of valve opening required to power the vehicle at the selected limited maximum speed, a speed indicator responsive to the speed of the vehicle, a normally open circuit breaker in the electrical circuit operating in conjunction with the speed indicator to close the circuit when the speed indicator registers the vehicle speed corresponding to the setting of the speed control device, and a second circuit breaker accessible to the driver while operating the vehicle for instantaneously deenergizing the magnetic coil at the will of the driver irrespective of the speed of the vehicle.

4. In a self-propelled vehicle, a motor in driving relationship with the vehicle, a fuel line adapted to feed fuel to the motor, a normally open throttle valve in the fuel line, a spring resiliently holding the valve in open position, a second throttle valve in the fuel line controlled by the operator during normal operation of the vehicle, a speed control device comprising an electro-magnet, an armature movable in the magnet field and operatively connected to the valve, an adjustable stop to limit the closing of the valve in response to the energization of the electro-magnet, an electric circuit including a source of current, a normally open circuit breaker in the circuit including a switch member adapted to move linearly within predetermined limits directly in proportion to the speed of the vehicle, a contact member located in the path of the switch member and being adapted to make contact with the member when their positions coincide, and means for adjusting the position of the contact member, said last named means being operatively connected to the adjustable stop so that adjusting the position of the contact member to the desired maximum speed also adjusts the position of the stop to limit the closing of the valve to the required opening to power the vehicle at the selected speed, and a second circuit breaker accessible to the driver when he is operating the vehicle for instantaneously breaking the circuit to the coil at the will of the driver irrespective of the speed of the vehicle.

5. In a power driven vehicle, a source of power, a multiple speed transmission for conveying the power to the vehicle wheels, a fuel line feeding fuel to the source of power, a throttle valve in the fuel line, speed control means functioning proportionately to the speed of the engine for limiting the throttle opening and comprising a speed responsive device operatively connected to the valve to limit the degree of opening of the valve in the fuel passage, manual control means accessible to the driver when operating the vehicle for selectively varying the critical speed at which the speed control means operates, means regulated by the manual control means for limiting the degree of opening of the valve for each setting to correspond to the minimum required opening to maintain the selected maximum vehicle speed, means associated with the transmission for operatively connecting the speed control means to the vehicle only when the transmission is in the high speed position, and manual disengaging means accessible to the driver when he is operating the vehicle and associated with the speed responsive device for substantially instantaneously disengaging the speed control means from the operation on the vehicle.

WILLIAM B. CASSELS.